(12) United States Patent
Beroth et al.

(10) Patent No.: US 9,174,737 B2
(45) Date of Patent: Nov. 3, 2015

(54) AIRCRAFT SEAT WITH TRANSLATING SEATBACK LINKAGE PIVOT

(71) Applicant: B/E Aerospace, Inc., Wellington, FL (US)

(72) Inventors: Michael Beroth, Winston-Salem, NC (US); Javier Valdes De La Garza, Miami, FL (US); Daniel Udriste, Coral Springs, FL (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 14/247,519

(22) Filed: Apr. 8, 2014

(65) Prior Publication Data

US 2014/0300161 A1    Oct. 9, 2014

Related U.S. Application Data

(60) Provisional application No. 61/809,572, filed on Apr. 8, 2013.

(51) Int. Cl.
    *B64D 11/06*     (2006.01)
    *B60N 2/22*      (2006.01)
    *B60N 2/34*      (2006.01)

(52) U.S. Cl.
    CPC ............ *B64D 11/064* (2014.12); *B60N 2/2209* (2013.01); *B60N 2/34* (2013.01); *B64D 11/06* (2013.01); *B64D 11/0641* (2014.12)

(58) Field of Classification Search
    CPC .......................... B64D 11/064; B64D 11/0641
    USPC ............................ 297/317, 320, 322, 354.13
    See application file for complete search history.

(56) References Cited

U.S. PATENT DOCUMENTS

| | | | |
|---|---|---|---|
| 5,333,818 A | 8/1994 | Brandt | |
| 6,059,364 A * | 5/2000 | Dryburgh et al. | 297/354.13 |
| 6,478,256 B1 | 11/2002 | Williamson | |
| 7,469,861 B2 * | 12/2008 | Ferry et al. | 244/118.6 |
| 8,616,643 B2 * | 12/2013 | Darbyshire et al. | 297/342 |
| 2001/0000639 A1 | 5/2001 | Park | |
| 2003/0080597 A1 * | 5/2003 | Beroth et al. | 297/330 |
| 2004/0036336 A1 * | 2/2004 | Veneruso | 297/354.13 |

FOREIGN PATENT DOCUMENTS

| | | |
|---|---|---|
| EP | 1 074 468 A2 | 2/2001 |
| GB | 2 476 385 A | 6/2011 |
| WO | 2008 122761 A1 | 10/2008 |

OTHER PUBLICATIONS

European International Search Report for International Application No. PCT/US2014/033313 dated Jul. 15, 2014.

* cited by examiner

*Primary Examiner* — Elizabeth A Plummer
(74) *Attorney, Agent, or Firm* — Shumaker, Loop & Kendrick, LLP

(57) ABSTRACT

An aircraft passenger seat configured to recline and including a seatpan pivotally attached to a seatback, a spreader defining a non-linear guide path controlling the seatpan angle as the seat reclines, translating seatback linkage defining a non-linear guide path controlling the seatback angle as the seat reclines, and a drive link arranged to translate horizontally relative to the spreader to drive seat recline motion.

18 Claims, 5 Drawing Sheets

AIRCRAFT SEAT WITH TRANSLATING SEATBACK LINKAGE PIVOT

CROSS-REFERENCE TO RELATED APPLICATION

This Application claims priority from U.S. application Ser. No. 61/809,572 filed Apr. 8, 2013, the entirety of which is incorporated by reference herein.

TECHNICAL FIELD AND BACKGROUND OF THE INVENTION

The present invention relates generally to an aircraft passenger seat configured to recline, and more particularly, to an aircraft passenger seat having a translating seatback linkage pivot for providing greater control and customization over the relationship of the seatback and seatpan angles as the seat reclines.

Aircraft passenger seats are typically configured to recline during flight to enhance comfort. Premium and luxury seats, such as those found in passenger suites, may be configured to recline to horizontal for sleeping. More economical seats typically have a limited amount of recline due to space limitations behind the seat.

In the above reclining seats, the seatback and seatpan are typically pivotally attached in an arrangement in which the pivot is fixed. In such an arrangement, the movement of one seating surface can advantageously be used to drive the movement of the other, but the horizontal fixing of the pivot disadvantageously limits the amount of seatback recline, particularly in seats with a fixed privacy partition located behind the seat and a short distance between the pivot and the partition. Further, the pivotal attachment of the seatback and seatpan in such a constrained space limits achieving certain seating angles during the reclining motion. Therefore, what is needed is a seat recline mechanism configured to take full advantage of limited space, as well as a seat recline mechanism configured to achieve seat angles not capable of being achieved in fixed pivot seats without the complexity, cost and weight of additional actuators.

BRIEF SUMMARY OF THE INVENTION

In a first embodiment, provided herein is an aircraft passenger seat configured to recline including a seatpan pivotally attached to a seatback, a fixed spreader defining a first non-linear guide path arranged to guide seatpan movement, seatback linkage arranged to translate relative to the fixed spreader, and a drive link arranged to translate horizontally relative to the fixed spreader to recline the seat.

In a further aspect, a first end of the drive link may be attached to a forward end of the seatpan and a second end of the drive link may travel along a second non-linear guide path of the seatback linkage.

In a further aspect, the drive link may be arranged to move horizontally away from the fixed spreader to drive the seatback toward horizontal and move toward the fixed spreader to drive the seatback toward vertical.

In a further aspect, the aircraft seat may include a seatback link pivotally attached at a first end to the seatback and pivotally attached at a second end to the seatback linkage, the seatback link arranged to pivot in a direction of the seatback linkage as the aircraft passenger seat reclines, and in a direction apart from the seatback linkage as the seatback returns upright.

In a further aspect, a first end of the seatback linkage may be pivotally attached to the fixed spreader such that a second end of the seatback linkage is free to pivot up and down as the drive link translates horizontally relative to the fixed spreader.

In a further aspect, the aircraft seat may include a linear actuator positioned beneath the seatpan for driving horizontal translation of the drive link.

In a further aspect, the angle between the seatpan and the seatback may increase as the seatback moves toward horizontal.

In a further aspect, the seatpan and the seatback may translate forward relative to the fixed spreader as the aircraft passenger seat reclines.

In a further aspect, the seat may include a first roller spaced in fixed relation from the pivot of the seatpan and the seatback that travels along the first non-linear guide path of the fixed spreader to control seatpan movement, and a second roller fixed to the drive link that travels along the second non-linear guide path of the seatbacklinkage to drive seatback linkage movement as the drive link translates horizontally relative to the fixed spreader.

In a further aspect, the seat includes spaced left and right fixed spreaders interconnected through transverse forward, center and rear beam tubes, and spaced legs connected to one or more of the transverse forward, center and rear beam tubes.

In a further aspect, the seatback linkage may pivot relative to the fixed spreader as the drive link translates horizontally relative to the fixed spreader.

In a further aspect, the first non-linear guide path may be shaped to control the seatpan angle and the second linear guide path may be shaped to control the seatback angle as the aircraft passenger seat reclines.

According to another embodiment of the invention, provided herein is an aircraft passenger seat configured to recline and including a seatpan pivotally attached to a seatback, a spreader defining a non-linear guide path controlling the seatpan angle as the aircraft passenger seat reclines, translating seatback linkage defining a non-linear guide path controlling the seatback angle as the aircraft passenger seat reclines, and a drive link arranged to move the seatpan along the non-linear guide path of the spreader and the seatback along the non-linear guide path of the seatback linkage as the drive link translates horizontally relative to the spreader.

In a further aspect, the spreader may be fixed, the seatback linkage may be pivotally attached to the spreader, and the drive link may be arranged to move horizontally away from the fixed spreader to drive the seatback toward horizontal and move toward the fixed spreader to drive the seatback toward vertical.

In a further aspect, the seat may include a seatback link pivotally attached at a first end to the seatback and pivotally attached at a second end to the seatback linkage, the seatback link arranged to pivot in a direction of the seatback linkage as the aircraft passenger seat reclines, and in a direction apart from the seatback linkage as the seatback returns upright.

In a further aspect, the seat may include an actuator positioned beneath the seatpan for driving horizontal translation of the drive link.

The aircraft seat may include one or more or a combination of the above features and aspects.

BRIEF DESCRIPTION OF THE DRAWINGS

Features, aspects and advantages of the present invention are understood when the following detailed description of the invention is read with reference to the accompanying drawings, in which.

DETAILED DESCRIPTION OF THE INVENTION

Figure 1:
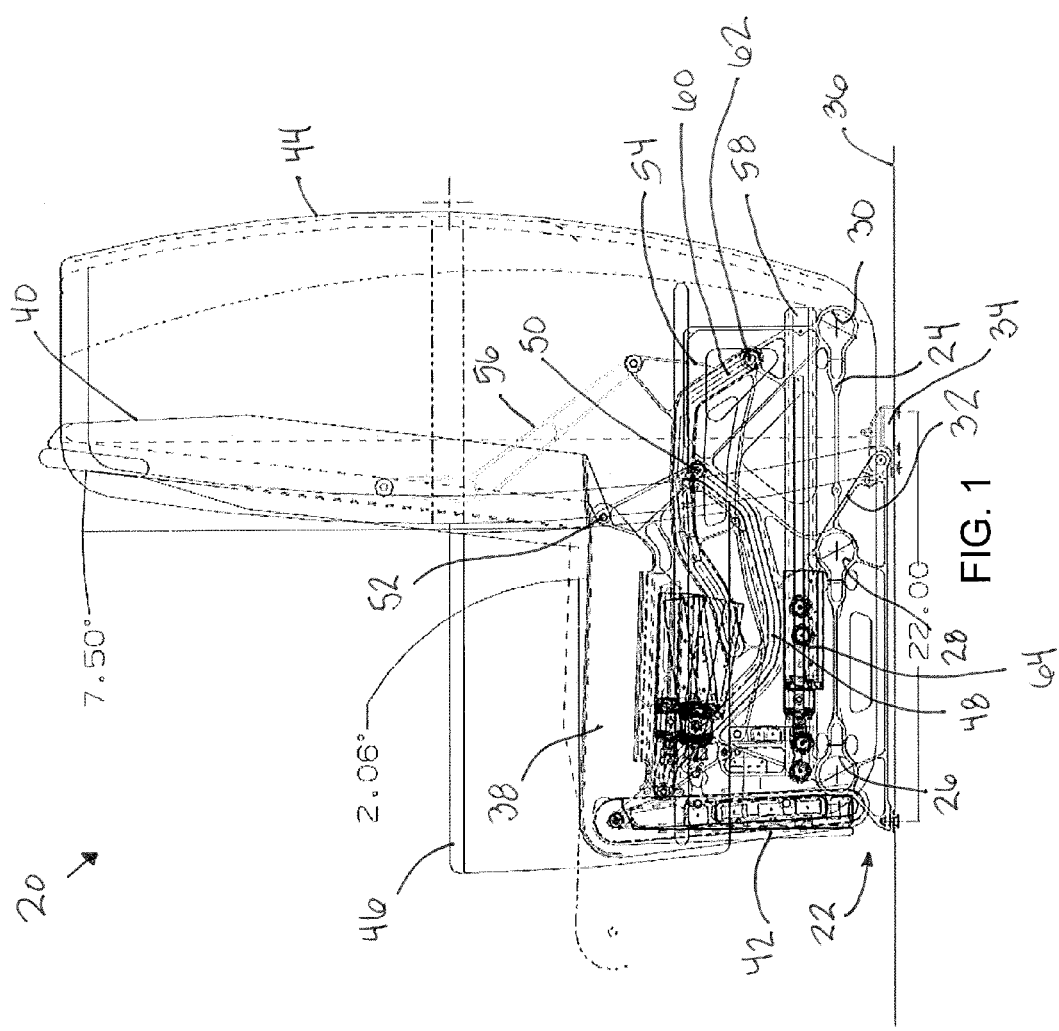
FIG. 1 is a side view of an aircraft seat according to an embodiment of the invention shown in an upright sitting position.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, an aircraft passenger seat configured with a seatback recline and translation mechanism is shown generally at reference numeral 20. The seat 20 generally includes a fixed seat base frame 22 supporting the seat throughout various sitting positions. The fixed seat base frame 22 generally includes spaced left and right spreaders 24 interconnected through transverse beam tubes. As shown, the transverse beam tubes include a forward beam 26, a center beam 28, and a rear beam 30 arranged horizontally coplanar spaced along the length of the spreaders 24. Left and right legs 32 attach to the spreaders 24 to support the seat. Conventional track fasteners, for example, anti-rattle track fasteners 34, may be used to secure the legs 32 to the floor 36. Although only one side of the seat is shown throughout the figures for clarity of movement, it should be understood that the seat includes left and right-side versions of various components to maintain the seat square and parallel throughout its range of motion.

The seat 20 further includes a seatpan 38 pivotally attached to a seatback 40, and may optionally include an actuator driven legrest 42. The seatpan 38, seatback 40, and optional legrest 42 are arranged and interconnected such that the seating surfaces may move together as the seat moves between upright and lie-flat seating positions. Seat recline is preferably driven through seatpan movement, with legrest angular deployment being independent of seatpan movement. The seat 20 may be surrounded by a fixed shell or partition 44, and further includes left and right armrests 46.

The left and right spreaders 24, which are horizontally and vertically fixed, each define a non-linear guide path 48 arranged to guide seatpan movement. As shown, the guide path 48 has a substantially arcuate shape extending substantially the length of the spreader 24. The ends of the guide path 48 are the highest vertical points of the guide path (i.e., the guide path "opens" upward"), with the forward end being slightly vertically higher that the rearward end. In this arrangement, the rear end of the seatpan 38 is lowest at mid-recline to provide a cradling sitting position. The guide path 48 guides a roller 50 spaced in fixed relation from the pivot 52 of the seatpan 38 and seatback 40. As the roller 50 travels from the rearward end to the forward end of the guide path 48, the seatpan 38 pivots about a drive link attachment point such that the rear end of the seatpan starts high, lowers, then vertically rises. The shape, length and curvature of the guide path 48 may be customized to control seatpan movement and the angle of the seatpan.

The seatback 40 is supported by linkage including seatback linkage 54 arranged to move relative to the fixed spreader 24 to guide seatback movement, and a seatback link 56 pivotally attached at a first end to the seatback 40 and pivotally attached at a second end to the seatback linkage 54. The seatback link 56 is arranged to pivot in a direction of the seatback linkage 54 as the seatback reclines, and in a direction apart from the seatback linkage 54 as the seatback returns upright. A first end of the seatback linkage 54 is pivotally attached to the fixed spreader 24 such that a second end of the seatback linkage is free to pivot up and down as the drive link 58 translates horizontally relative to the fixed spreader 24.

The seatback linkage 54 also defines a non-linear guide path 60 for guiding movement of the seatback 40 and controlling the angle thereof. The non-linear guide path 60 is also generally arcuate shaped, however, opens "downward." As the seatback 40 translates forward to recline, a roller 62 fixed to the drive link 58 travels along the guide path 60 from the rearward end to the forward end of the guide path, thereby controlling the seatback angle as the seatback reclines. The respective shapes and path lengths of the two guide paths 48, 60 can be customized to control the seatpan 38 and seatback 40 angles and the relationship therebetween throughout the range of motion of the seat. In a preferred embodiment, the seat is steplessly adjustable throughout its range of motion to achieve a nearly number of sitting positions.

The drive link 58 is arranged to translate horizontally relative to the fixed spreader 24 to drive the seat between its upright and lie-flat sitting positions. A forward end of the drive link 58 is attached to a forward end of the seatpan 38, and a rear (i.e., second) end of the drive link includes the roller 62 arranged to travel along the guide path 60. As the drive link 58 moves horizontally forward (i.e., in the direction away from the fixed spreader 24), the drive link pulls the seatpan 38 horizontally forward such that the roller 50 travels along the guide path 48 controlling the seatpan angle. At the same time, the seatback 40 translates forward along with the seatpan 38 because of the pivotal connection therebetween, and the angle of the seatback 40 is controlled as the seatback linkage 54 is moved. The drive link 58 may be moved horizontally using a linear actuator 64 located beneath the seatpan 38 and fixed to the seat base frame. In a particular embodiment, the linear actuator 64 may be a screw-type actuator known to those skilled in the art for effecting linear motion. The drive link 58 translates horizontally away from the fixed spreader 24 to "pull" the seatback 38 toward horizontal, and translates toward the fixed spreader 24 to "push" the seatback 38 toward vertical.

Referring to FIG. 1, the seat 20 is shown in an upright sitting position for taxi, takeoff and landing ("TTOL"). In the upright sitting position, the relationship between the seatpan and seatback angles may be about 2° from horizontal for the seatpan 38 and about 7.5° from vertical for the seatback 40, with the seatpan 38 sloping in the rearward direction to cradle the passenger.

Figure 2:
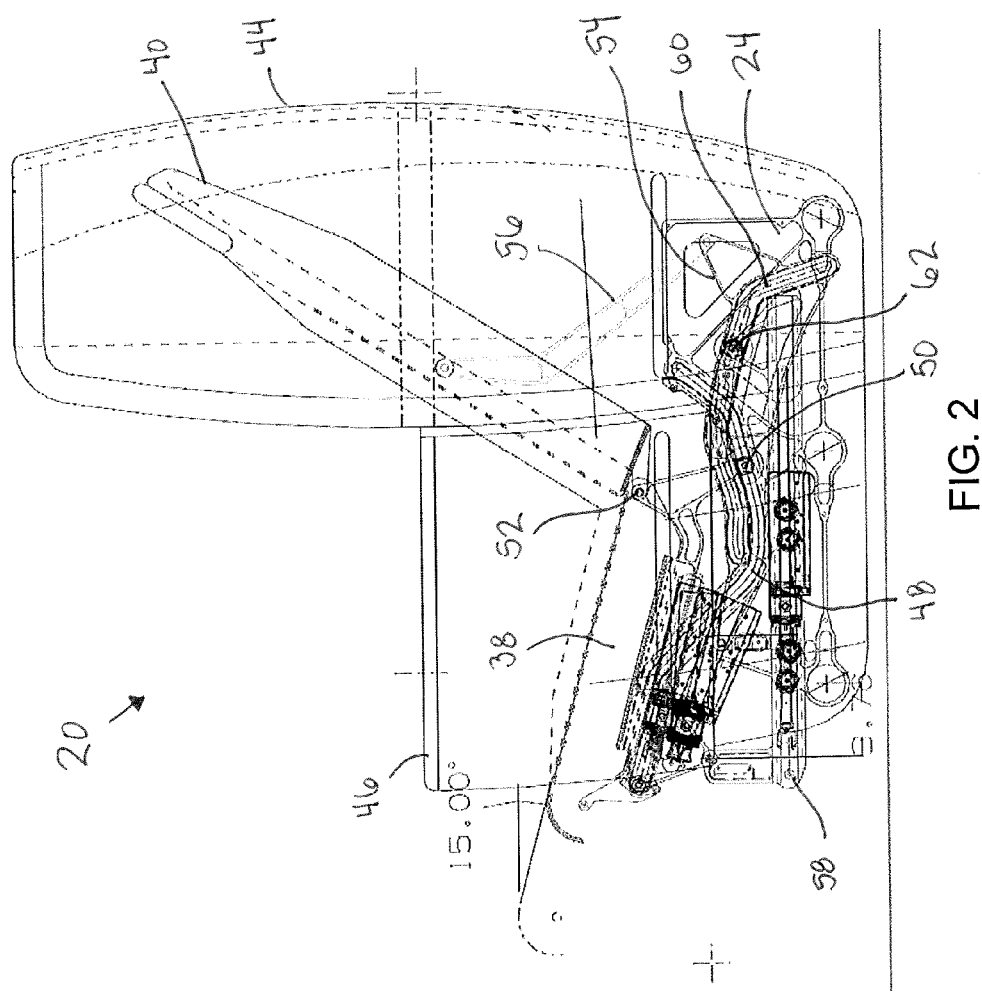
FIG. 2 is a side view of the seat of FIG. 1 shown in a mid-recline sitting position.

Referring to FIG. 2, as the seat 20 reclines, the relationship between the seatpan and seatback angle may change to about 15° from horizontal and about 32° from vertical for the respective seatpan 38 and seatback 40.

Figure 3:
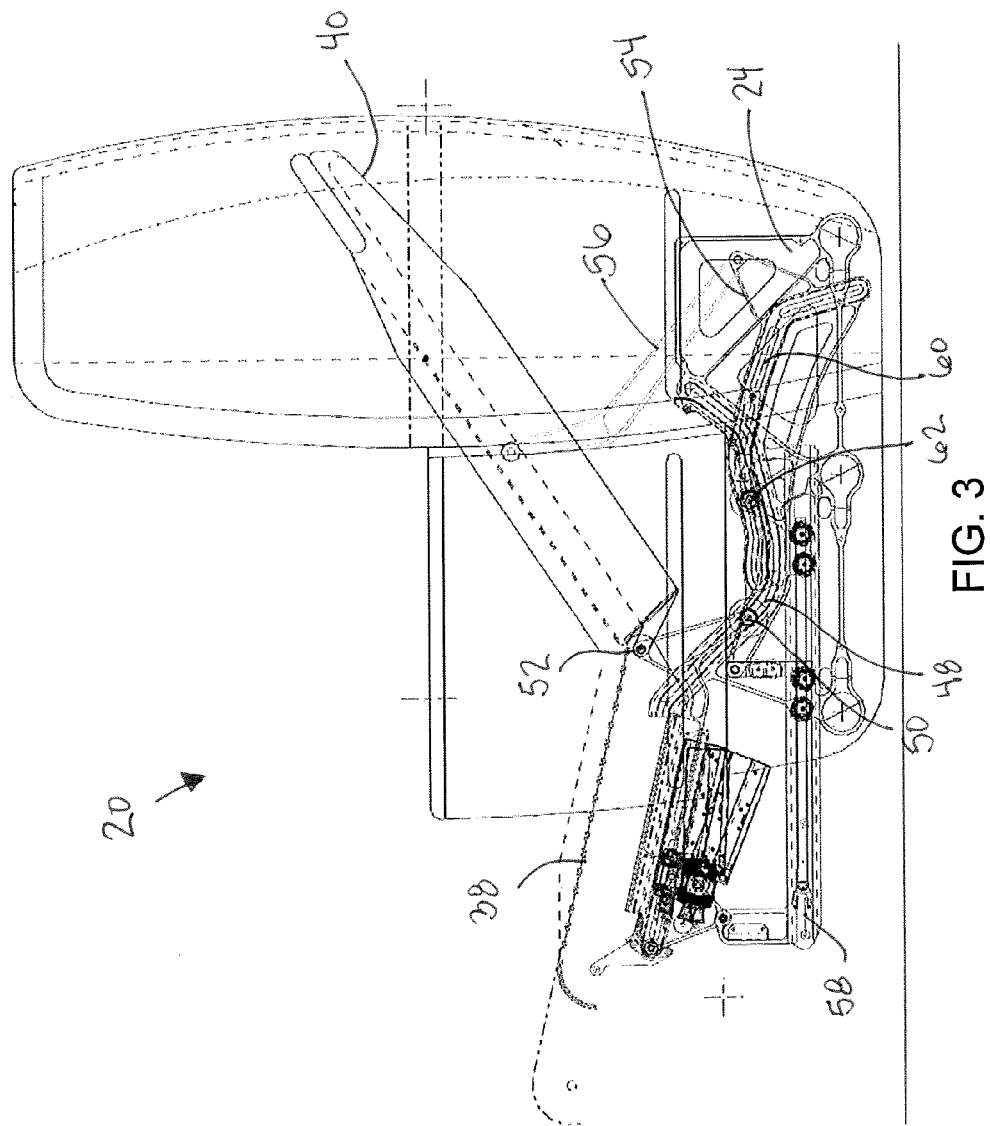
FIG. 3 is a side view of the seat of FIG. 1 shown in another mid-recline sitting position.

Referring to FIG. 3, as the seat 20 continues to recline, the relationship between the seatpan and seatback angle may change to about 13° and about 56° for the respective seatpan 38 and seatback 40.

Figure 4:
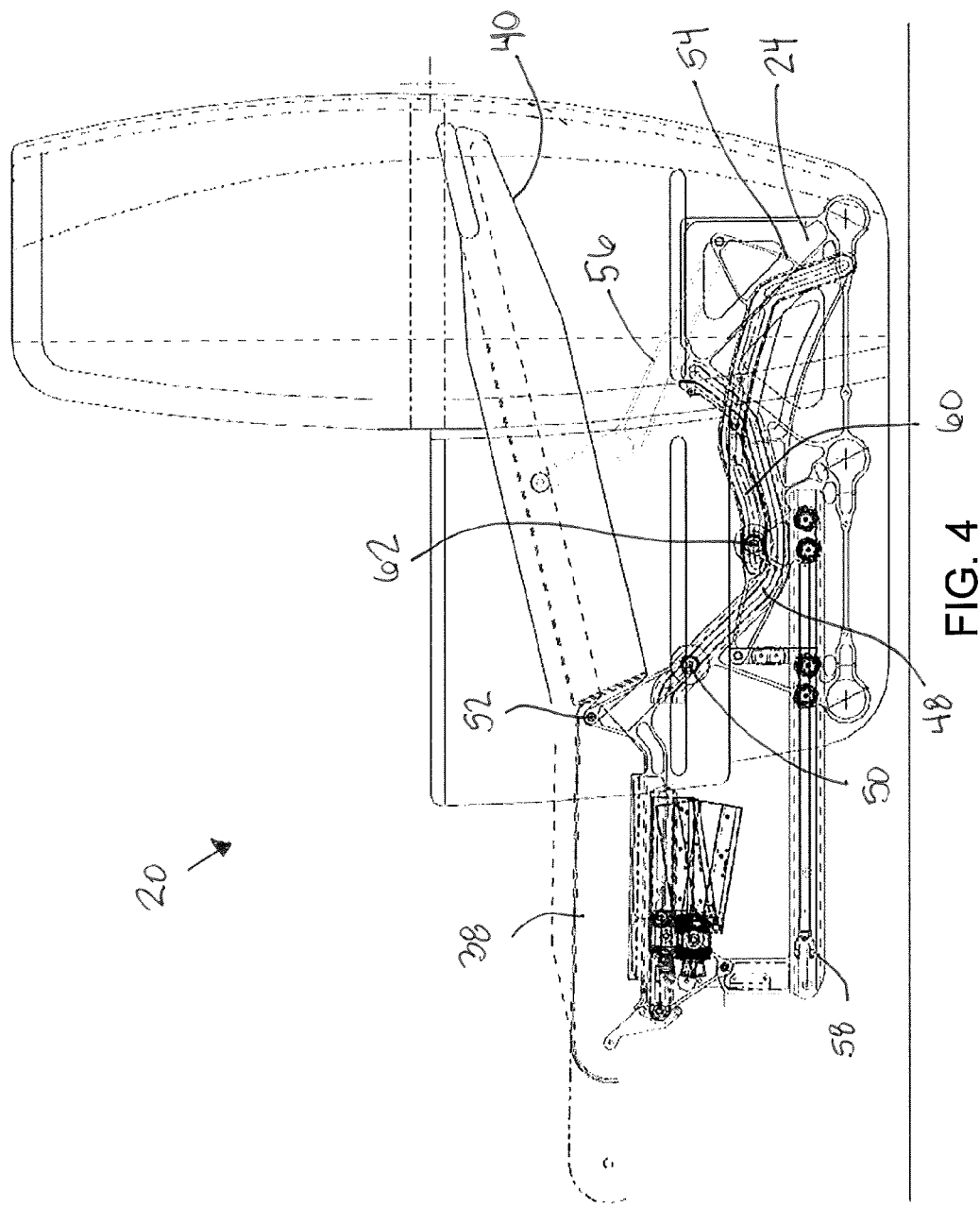
FIG. 4 is a side view of the seat of FIG. 1 shown with the seatback reclined to near horizontal.

Referring to FIG. 4, with the seat 20 nearly horizontal, the relationship between the seatpan and seatback angle may change to about 0° and about 77° for the respective seatpan 38 and seatback 40.

Figure 5:
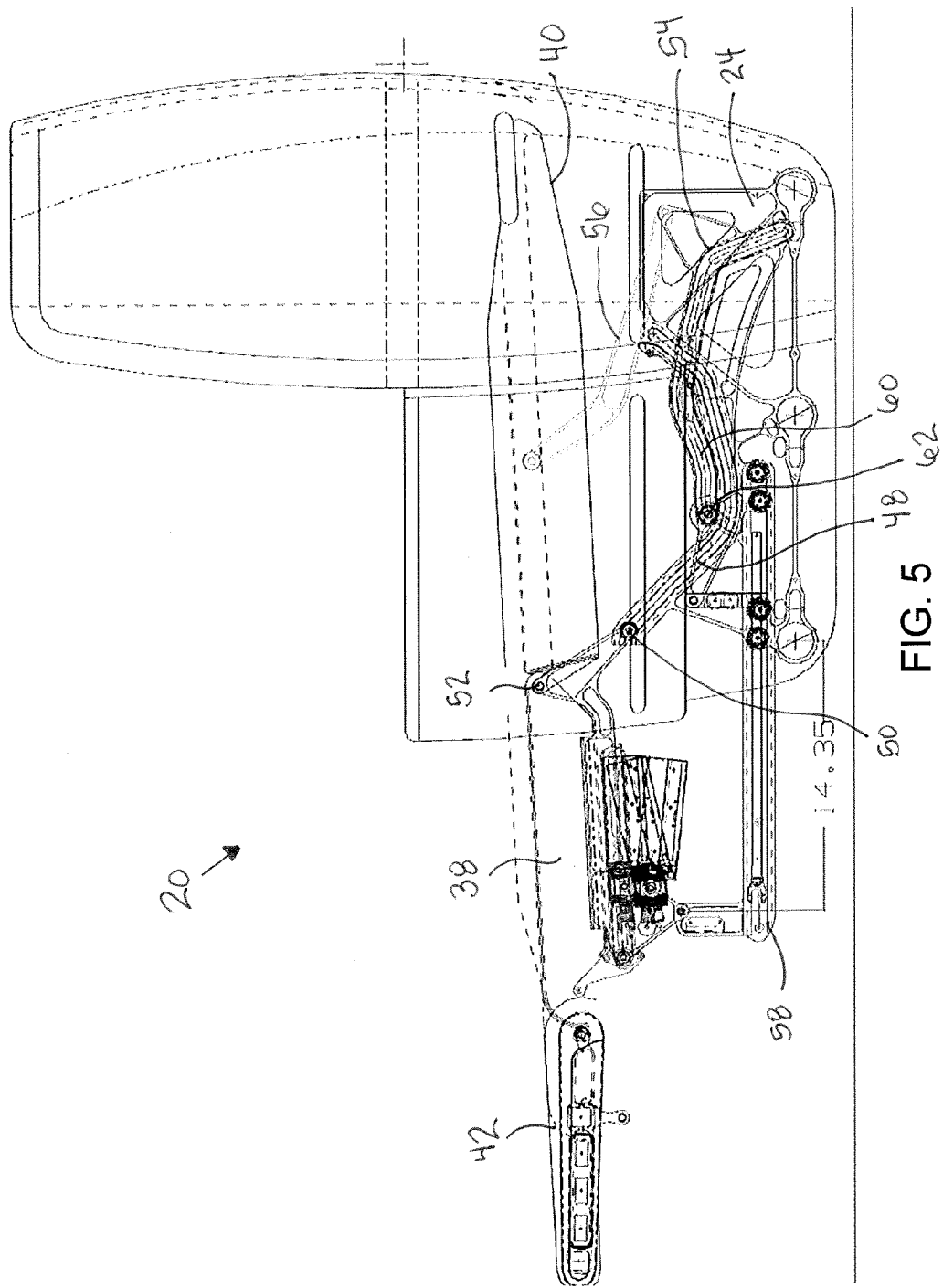
FIG. 5 is a side view of the seat of FIG. 1 shown fully reclined to form a flat bed.

Referring to FIG. 5, with the seat in a horizontal sleeping position, the seatpan and seatback angles may be nearly 0°, for example, about 2° and about 88° for the respective seatpan 38 and seatback 40, with the seatpan 38 sloping forward. In other mid-recline sitting positions, the relationship between the seatpan and seatback angles is controlled and dictated by the path shapes and arrangement of the guide paths 48, 60. For example, in other mid-recline sitting positions the seatpan and seatback angles may be 12.5° and 25° respectively, 17.5° and 40° respectively, and 17.5° and 47° respectively, as a result of a more linear portion along the first guide path 48 that holds the seatpan angle steady as the seatback 40 continues its recline.

The shapes of the guide paths 48, 60 can be customized to control the seatpan and seatback angles as the seat reclines. For example, as shown, the guide path 48 of the fixed spreader 24 changes the angle of the seatpan 38 as the seat reclines by raising and lowering the rear end of the seatpan. The guide paths and vertical positions of the ends thereof can be customized to control the angles of the seatpan 38 and the seatback 40 as the seat reclines. Further control of the seatpan and seatback angles can be achieved by changing the pivotal attachment locations and shape of the various linkage. Prior to the present invention, simultaneously lifting the seatpan and the seatback by pushing the seat backwards was not achievable without employing multiple actuators.

The foregoing description provides embodiments of the invention by way of example only. It is envisioned that other embodiments may perform similar functions and/or achieve similar results. Any and all such equivalent embodiments and examples are within the scope of the present invention.

What is claimed is:

1. An aircraft passenger seat configured to recline, comprising:
    a seatpan pivotally attached to a seatback;
    a fixed spreader defining a first non-linear guide path for controlling the angle of the seatpan as the aircraft passenger seat reclines;
    seatback linkage arranged to pivot relative to the fixed spreader as the aircraft passenger seat reclines, the seatback linkage defining a second non-linear guide path for controlling the angle of the seatback as the passenger seat reclines; and
    a drive link arranged to translate horizontally relative to the fixed spreader to recline the aircraft passenger seat;
    wherein the seatback linkage is pivotally attached at one end to the fixed spreader such that the seatback linkage pivots as the drive link translates horizontally relative to the fixed spreader.

2. The aircraft passenger seat of claim 1, wherein a first end of the drive link is attached to a forward end of the seatpan and a second end of the drive link travels along the second non-linear guide path of the seatback linkage, and wherein the drive link is arranged to move horizontally away from the fixed spreader to drive the seatback toward horizontal and move toward the fixed spreader to drive the seatback toward vertical.

3. The aircraft passenger seat of claim 1, further comprising a seatback link pivotally attached at a first end to the seatback and pivotally attached at a second end to the seatback linkage, the seatback link arranged to pivot in a direction of the seatback linkage as the seatback reclines, and in a direction apart from the seatback linkage as the seatback returns upright.

4. The aircraft passenger seat of claim 1, further comprising a linear actuator positioned beneath the seatpan for driving horizontal translation of the drive link.

5. The aircraft passenger seat of claim 1, wherein the first and second non-linear guide paths are shaped to control the relationship between the angles of the seatpan and the seatback as the aircraft passenger seat reclines and moves toward upright.

6. The aircraft passenger seat of claim 1, wherein the seatpan and the seatback translate forward relative to the fixed spreader as the aircraft passenger seat reclines.

7. The aircraft passenger seat of claim 1, wherein a first roller spaced in fixed relation from the pivot of the seatpan and the seatback travels along the first non-linear guide path of the fixed spreader to control seatpan movement, and a second roller fixed to the drive link travels along the second non-linear guide path of the seatback linkage to drive seatback linkage movement as the drive link translates horizontally relative to the fixed spreader.

8. The aircraft passenger seat of claim 1, further comprising spaced left and right fixed spreaders interconnected through transverse forward, center and rear beam tubes, and spaced legs connected to one or more of the transverse forward, center and rear beam tubes.

9. The aircraft passenger seat of claim 1, wherein the seatback linkage pivots relative to the fixed spreader as the drive link translates horizontally relative to the fixed spreader.

10. The aircraft passenger seat of claim 1, wherein the first non-linear guide path is shaped to control the seatpan angle and the second linear guide path is shaped to control the seatback angle as the aircraft passenger seat reclines.

11. An aircraft passenger seat configured to recline, comprising:
    a seatpan pivotally attached to a seatback;
    a fixed spreader defining a first non-linear guide path controlling seatpan angle as the aircraft passenger seat reclines;
    seatback linkage defining a second non-linear guide path controlling seatback angle as the aircraft passenger seat reclines; and
    a drive link arranged to move the seatpan along the first non-linear guide path of the spreader and the seatback along the second non-linear guide path of the seatback linkage as the drive link translates horizontally relative to the spreader;
    wherein the seatback linkage is pivotally attached at one end to the fixed spreader such that the seatback linkage pivots as the drive link translates horizontally relative to the fixed spreader.

12. The aircraft passenger seat of claim 11, wherein the spreader is fixed, the seatback linkage is pivotally attached to the spreader, and the drive link is arranged to move horizontally away from the fixed spreader to drive the seatback toward horizontal and move toward the fixed spreader to drive the seatback toward vertical.

13. The aircraft passenger seat of claim 11, further comprising a seatback link pivotally attached at a first end to the seatback and pivotally attached at a second end to the seatback linkage, the seatback link arranged to pivot in a direction of the seatback linkage as the seatback reclines, and in a direction apart from the seatback linkage as the seatback returns upright.

14. The aircraft passenger seat of claim 11, further comprising an actuator positioned beneath the seatpan for driving horizontal translation of the drive link.

15. The aircraft passenger seat of claim 11, wherein the angle between the seatpan and the seatback increases as the seatback moves toward horizontal.

16. The aircraft passenger seat of claim 11, wherein the seatpan and the seatback translate forward relative to the spreader as the aircraft passenger seat reclines.

17. The aircraft passenger seat of claim 11, wherein a first roller spaced in fixed relation from the pivot of the seatpan and the seatback travels along the non-linear guide path of the spreader to control the seatpan movement, and a second roller fixed to the drive link travels along the non-linear guide path of the seatback linkage to drive seatback linkage movement as the drive link translates horizontally relative to the spreader.

18. The aircraft passenger seat of claim 11, further comprising spaced left and right spreaders interconnected through transverse forward, center and rear beam tubes, and spaced legs connected to one or more of the transverse forward, center and rear beam tubes.

\* \* \* \* \*